United States Patent [19]

Pacheco

[11] Patent Number: 5,035,516
[45] Date of Patent: Jul. 30, 1991

[54] BARBECUE GRILL CLEANER BAG

[76] Inventor: LeRoy R. Pacheco, 5230 South 935 East, Salt Lake City, Utah 84117

[21] Appl. No.: 205,739

[22] Filed: Jun. 13, 1988

[51] Int. Cl.$^5$ ............................................. B65D 33/01
[52] U.S. Cl. ........................................ 383/41; 383/59; 383/61; 383/103; 383/108; 134/93; 134/200
[58] Field of Search ..................... 383/41, 48, 71, 101, 383/103, 108, 110, 127, 100, 45, 59, 61; 206/221; 134/84, 91, 200, 201, 93; 312/1

[56] References Cited

U.S. PATENT DOCUMENTS

| | | | |
|---|---|---|---|
| 2,273,128 | 2/1942 | Madsen et al. | 383/61 |
| 3,802,919 | 4/1974 | Saffir | 383/63 |
| 4,155,453 | 5/1979 | Ono | 383/61 |
| 4,595,101 | 6/1986 | Rivera | 383/103 |
| 4,626,291 | 12/1986 | Natale | 312/1 |

Primary Examiner—Stephen Marcus
Assistant Examiner—Jes F. Pascua
Attorney, Agent, or Firm—Terry M. Crellin

[57] ABSTRACT

A disposable container for cleaning outdoor barbecue grills is disclosed comprising a flexible, generally rectangular, reclosable plastic bag having opposing front and rear wall panels joined together at the bottom and opposing side edges in a fluid tight relationship and reclosable at the top edges by interlocking male and female profiles. The bag contains spaced apart vent means and filling means extending through a wall panel in the upper portion thereof below the interlocking profiles. Drain means in the lower portion of a wall panel is optional. A dirty grill is placed in the bag and the profiles are locked. The vent means is opened and a cleaning agent is added to the bag through the filling means. Once filled, the grill is cleaned by the cleaning agent within the bag. The bag is drained through the vent or drain means and the grill rinsed with water. The bag is drained, the grill removed and the bag is disposed of.

12 Claims, 2 Drawing Sheets

BARBECUE GRILL CLEANER BAG

BACKGROUND OF THE INVENTION

1. Field of the Invention

This invention relates to a disposable bag for cleaning barbecue grills. More particularly, this invention relates to a heavy duty plastic bag into which barbecue grills covered with grease and baked on residues can be placed and cleaned without the necessity of human hands directly contacting the grill.

A common and unpleasant chore to those who use outdoor barbecue grills is removing the grease and grime coated grills from the barbecue and cleaning them. If placed in a kitchen sink, the grills require hand scrubbing and create a mess in and around the sink area. Common cleaning detergents, even those considered "heavy duty", are often ineffective in removing the charred residue clinging to grill surfaces even after scrubbing with brushes, steel wool and the like.

2. Related Art

At present there is no simple, convenient way in which to clean barbecue grill surfaces which does not require a considerable investment in equipment or which is cumbersome to store.

For example, Tarrer, U.S. Pat. No. 4,226,255, issued Oct. 7, 1980, teaches an imperforate container having an open top and including a cover. The container is provided with an attachment mechanism for hanging on or in the vicinity of a barbecue. The container is adapted to contain a cleaning solution into which a removable barbecue grill or rack can be placed and soaked clean between periods of use.

An automatic cleaner is disclosed in Beke, U.S. Pat. No. 4,486,911, issued Dec. 11, 1984. The unit consists of a container having a cover portion from which a barbecue grill to be cleaned is suspended by means of depending compression springs. The container portion contains a rotating brush against which the grill is forced by the compression springs when the cover is in place. Hot water and detergent are placed in the container and the brush, connected by a spindle to a motor, is caused to rotate cleaning one side of the grill. To clean both sides the grill must be removed, turned over, and replaced in the cover. When through using the container, it must be drained and the dirty detergent-water solution disposed of.

OBJECTS AND SUMMARY OF THE INVENTION

It is an object of the present invention to provide a cleaning bag which provides for cleaning of a barbecue grill in any convenient location.

A further object of the invention is to provide a cleaning bag wherein strong cleaning agents can be utilized to clean a grill without coming into contact with the hands of the person performing the cleaning function.

Still another object of this invention is to provide a cleaning bag which envelopes a barbecue grill in a sealed fluid tight relationship; allows for introduction and drainage of cleaning agents and soaking of the grill if desired and yet is disposable.

These and other objects are accomplished by means of a generally rectangular plastic bag sized to hold a barbecue grill having opposing side panels which are either sealed on three sides or molded to be continuous and having a sealable open top. Closable vent means are located in a panel of the bag adjacent the top to allow for the escape of air during a filling operation. Entry means to allow for introduction of cleaning agents or solutions are also located in a panel adjacent the top. Preferably the entry and vent means will be in the same panel near the opposite side edges thereof. However, if desired, they could be in different panels. It may also be desirable to have a closable drain valve in the lower portion of one panel to drain liquid from the bag.

The bag is used by placing a soiled grill inside the bag, sealing the top, opening the vent, and filling the bag to the desired level with cleaning agents or solutions through the entry means. Excess air in the bag is vented and the vent means is closed. When the grill has been sufficiently cleaned inside the bag, the cleaning agents or solutions can be drained either through the vent means or drain means. If desired, water can be added through the entry means and drained until the grill has been fully rinsed. The bag is drained and the top opened. The clean grill is removed and the bag can be readily disposed of.

The details of construction and operation are more fully described and claimed below with reference being had to the accompanying drawing forming a part hereof.

BRIEF DESCRIPTION OF THE DRAWINGS

FIG. 3b is a side cross sectional view taken along lines 3b—3b of FIG. 3a.

FIG. 4b is a side cross sectional view taken along lines 4b—4b of FIG. 4a.

DETAILED DESCRIPTION OF THE INVENTION

Figure 1:
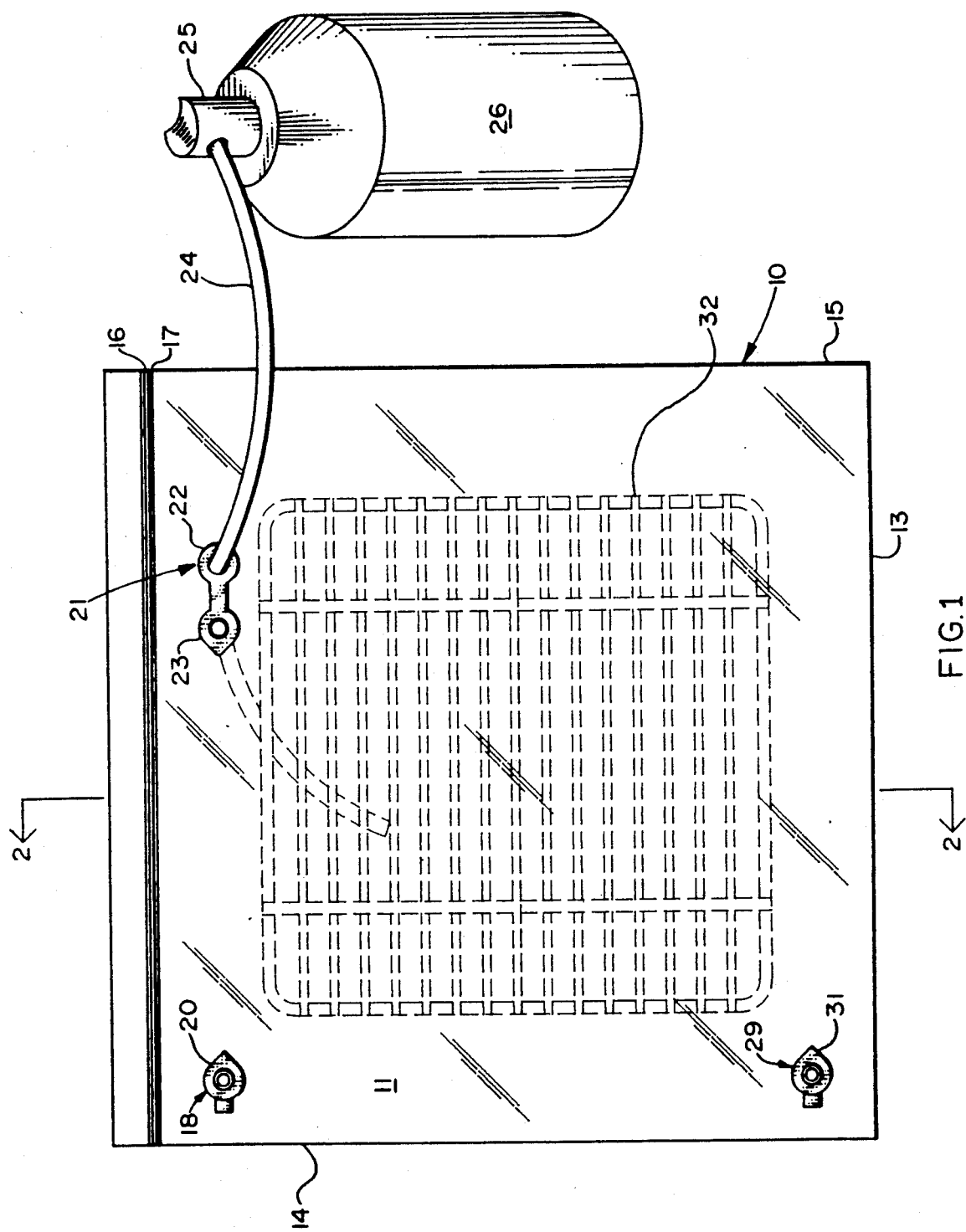
FIG. 1 is a front view of a bag having a barbecue grill contained therein and showing the positioning of vent, entry and drain means and also showing the attachment of a pressurized can of cleaning agent to the entry means.
Figure 2:
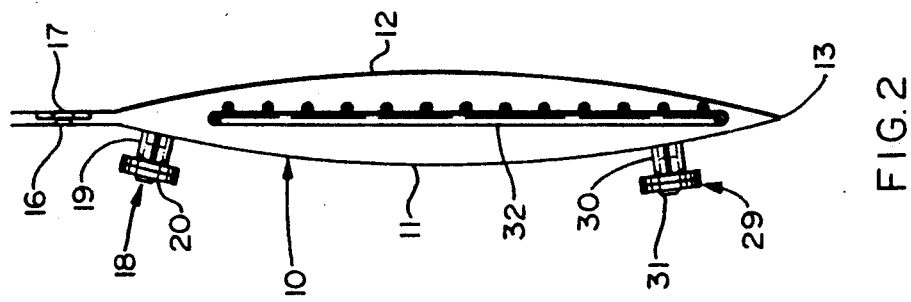
FIG. 2 is a cross sectional view taken along line 2—2 of FIG. 1 showing the bag containing a grill and filled with a cleaning fluid.

There is shown in FIGS. 1 and 2 a complete and preferred embodiment of the invention. The bag 10 is a reclosable generally rectangular plastic bag having integral front and back panels 11 and 12 respectively which are sealed at the bottom 13 and side edges 14 and 15 to form a fluid tight cavity. Obviously, the sealing of the bottom and side edges will depend upon the manufacturing technique and the invention is inclusive of any bag which is suitable for use as described herein. Therefore, a bag molded such that the front and back panels are of a continuous piece of material instead of being sealed at the side edges is considered to be the same as a bag having sealed side edges.

The upper side edges of the front and back wall panels 11 and 12 have interlocking male 16 and female 17 profiles which are integral with said panels, one being contained on each panel. These profiles are located on the inner panel walls near the upper edge and extend from one side edge 14 to the other side edge 15. Profiles 16 and 17 are of the proper size and shape to interlock repeatedly and are in exact alignment with each other. These profiles are of the same length so that, when closed, they interlock from side edge 14 to side edge 15. These interlocking profiles are similar to those commonly found in bags marketed under the Ziploc trademark. In fact, except for the size, gauge of the plastic making up the panels and the placement of vent, entry and drain means in the panel walls, they are similar in shape and appearance to Ziploc bags.

Closure means other than interlocking male and female profiles can also be used to close the bag 10 such that he cavity inside is sealed. Although less preferred and not as convenient, means such as zippers, stitching, ties and any and all other closure means that will render the bag sufficiently closed to the purposes described herein are within the scope of this invention.

The dimensions of the bag may vary according to the size of grills to be cleaned. Generally, most circular outdoor barbecue grills are not greater than about two feet in diameter and most rectangular grills are in sections which are not greater than about 24"×18". Therefore, bags having panels about 24"×24" are thought to be sufficient. However, it is to be stressed that specific sizes are not a critical part of this invention as long as the bag is large enough to hold the grill to be cleaned.

Obviously, the gauge of plastic employed must be thick enough that the bag will not burst when being used. For that reason thickness varying between about 2 mils to 10 mils are preferred. Again, the thickness is best expressed in functional terms requiring that the bag be sufficiently thick that it will allow for containment of a grill and liquid cleaner and/or rinse water and also allow some agitation or movement of the bag and its contents when the grill and liquid are contained therein.

Secured into and extending through one wall panel below but near the interlocking profiles is a vent 18 which allows air, vapors or other gaseous fluids to escape from the bag when the bag is closed and is being filled with a cleaning agent or solution. Vent 18 may be of any suitable form. That illustrated shows an outwardly extending hollow stem 19 welded or sealed to panel 11 and containing an integral cap or plug 20 which can be fitted into the stem to seal it after the bag has been sufficiently vented. Other types of vent means can be utilized. If desired the vent can be made to contain a filter to absorb and/or remove objectionable odors or vapors.

In the same panel 11 in which the vent means 18 is located, but spaced apart therefrom, is entry means 21 for filling the bag with a cleaning agent, solution or rinse water when the vent means 18 is open. Entry means 21 is also located below but near the interlocking profiles. Preferably, the vent means and entry means are in alignment in a plane parallel with the interlocking profiles. The entry means 21 may take several forms depending upon the filling mechanism. The entry means 21 illustrated is identical with the vent means, and consists of an outwardly extending stem 22 welded or sealed to panel 11 and containing an integral cap or plug 23 which can be fitted into the stem to seal it when the bag has been sufficiently filled with cleaning agent. To fill the bag, plug 23 is pulled out of stem 22 and one end of a filler tube 24 is inserted through the stem 22 to project into the bag interior as shown in FIG. 1. The other end of filler tube 24 is seated into a recess of a valve cap 25 of a pressurized fluid container 26 holding a foaming cleaning agent. Such containers are typically in use for cleaning ovens. The cleaning agent exits the pressurized container as a foam which is distributed over the oven surfaces and will also be distributed over the grill surfaces in the same manner. When sufficient cleaning agent has been foamed into the bag, the filler tube 24 is removed and plug 23 is reinserted into hollow stem 22.

Figure 3A:
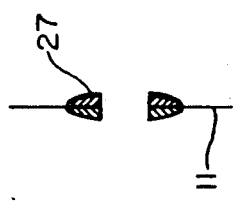
FIG. 3a is a fragmented front sectional view of a first alternate filling means embodiment.
Figure 3B:
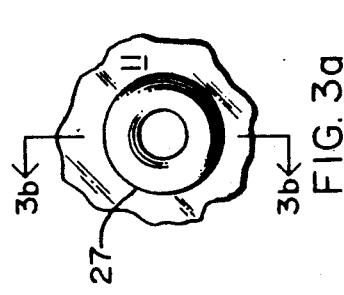

Another embodiment for an entry means is shown in FIGS. 3a and 3b and consists of an annular elastomeric ring 27 welded or sealed to panel 11. Ring 27 has a stretchable central opening through which a filler can be inserted. In this embodiment, the bag will remain sealed only when the filler tube is inserted in ring 27. The filler tube can be clamped or otherwise closed for maximum sealing purposes. If desired, panel 11 could be fabricated such that a filler tube is an integral part thereof.

Figure 4A:
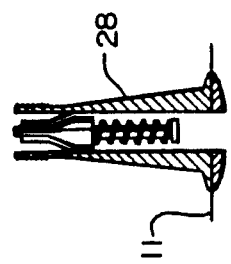
FIG. 4a is a fragmented front sectional view of a second alternate filling means embodiment.
Figure 4B:
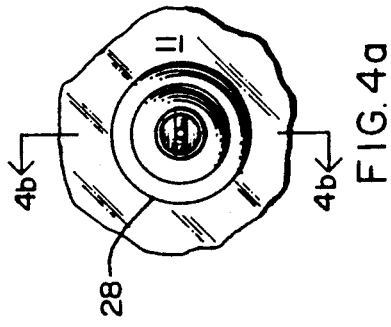

Still another embodiment for entry means is shown in FIGS. 4a and 4b and consists of a spring loaded valve stem 28 secured to panel 11. The outer end of stem 28 is threaded and is similar to valve stems used on inner tubes or pneumatic tires. Connection with the filling tube or container holding the cleaning agent is made by adapting the filling tube or container valve cap with a threaded female connector similar to that used on pressurized containers used for emergency inflating of flat tires.

Optionally, as shown in FIGS. 1 and 2, the bag 10 may have drain means 29 located in the lower portion of a panel for removing liquid in the bag when the cleaning operation is over. The drain means 29 may be similar to that disclosed for vent means 18 consisting of an outwardly extending hollow stem 30 welded or sealed to panel 11 or panel 12. A cap or plug 31, integral with the stem is present to seal the drain when not in use. Preferably, for simplicity in manufacturing, the vent 18, filling means 21 and drain 29 will all be in the same panel. Any other suitable drain means mechanism can also be used. If desired, the vent 18 means can also be used as a drain simply by turning the bag 90° so that the vent is positioned at a lower proximity of the bag.

In operation, the top of bag 10 is opened by unlocking the interlocking profiles 16 and 17 and inserting a dirty barbecue grill 32 into the interior of the bag as shown in FIGS. 1 and 2. The profiles 16 and 17 are then interengaged along their entire length to close the bag. With plug 20 removed from hollow stem 19 of vent 18 and plug 23 removed from hollow stem 22 of filler means 21, a filler tube 24 is inserted through the stem 22 and into the bag cavity. The opposite end of tube 24 is inserted into a recess in valve cap 25 of a pressurized container 26 holding oven cleaner or similar cleaning agents which will dissolve grease and charred or baked-on residues. The valve cap 25 in the container is pushed actuating a valve and the cleaning agent is allowed to enter the bag through filling tube 24. Excess air escapes through stem 19 of vent means 18 during the filling operation. When sufficient cleaning agent has entered the bag 10, the filler tube 24 is removed from stem 22 and the tube 24 is sealed off by inserting plug 23.

When using a foaming cleaning agent, such as an oven cleaner, vapors develop within the bag and come into contact with the grill surfaces dissolving and removing grease and residue on the grill surface. The grill can be rubbed by contacting the outer panel surfaces with the hand thereby avoiding direct contact with the cleaning agent.

In the alternative, the cleaning agent can be a detergent solution of any desired strength. The grill can be left to soak in the solution or can be rubbed from the outside as above described. Also, the bag is strong enough that moderate shaking of the bag with the grill and solution inside can take place.

In any event, when the grill surfaces are sufficiently cleaned, the drain 29 is opened (or the bag is rotated 90° and the vent 18 is opened) and the solution is allowed to drain from the bag. Rinse water can then be allowed to flow into the bag through the entry means 21 and repeated rinsings can take place until the grill is clean and all detergent or cleaning agent residue is flushed out. In the alternative, the bag can be opened after the initial cleaning and the grill is removed for rinsing. In either event, once the grill is removed, the bag can be easily disposed of by throwing it in the garbage or other disposal means.

As described above, the bag is easy to use, allows cleaning to take place without the necessity taking the grill into the kitchen for hand scrubbing in the sink. The grill can be cleaned in any convenient location and does not require the use of expensive equipment or containers which are bulky to store.

Figure 5:
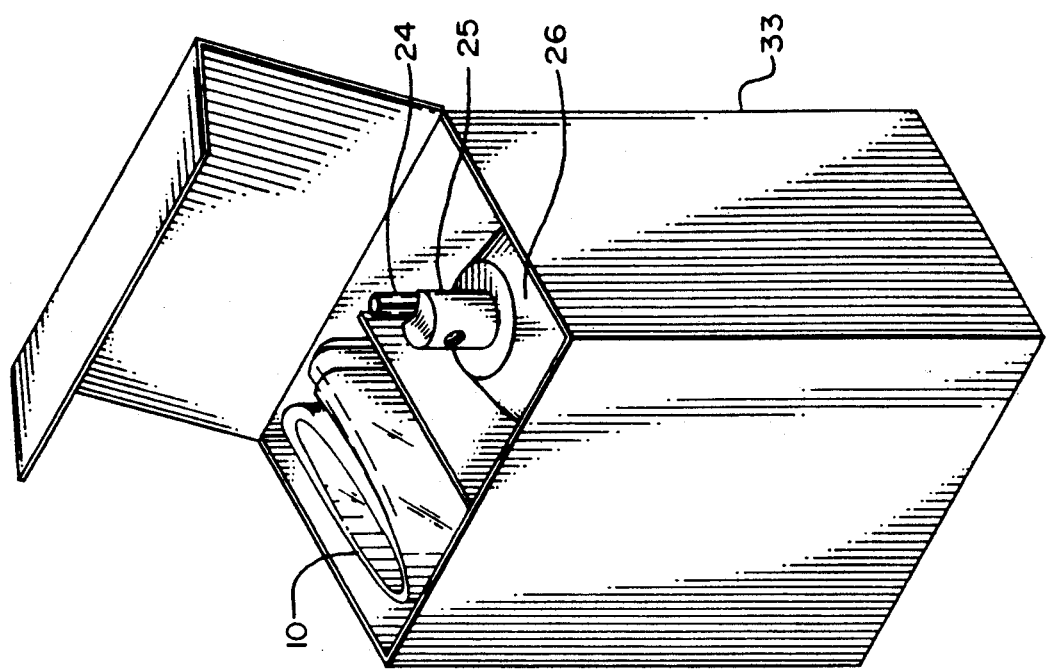
FIG. 5 is a perspective view showing one means of packaging the bag and a cleaner for marketing purposes.

FIG. 5 shows one means in which the invention can be marketed as a kit. The bag 10, a pressurized container 26 of cleaning agent with a valve cap 25 and a filler tube 24 are placed in a divided cardboard package 33 and sold as a unit.

The above is considered as illustrative only. From this description numerous modifications and changes will readily occur to those skilled in the art. Therefore, the invention is not limited to the exact construction and operation shown and described. Rather, all suitable modifications and equivalents which may be resorted to are within the scope of the invention.

I claim:

1. A disposable container for cleaning outdoor barbecue grills comprising a flexible, generally rectangular, reclosable plastic bag having opposing front and rear wall panels joined together at the bottom and opposing side edges in a fluid tight relationship to form an article receiving compartment which is reclosable at the top edges of the wall panels by fluid tight sealing means, said bag containing closable vent means extending through a wall panel in the upper portion thereof below said sealing means so that said vent means communicates with said compartment, said bag also containing entry means extending through a wall panel in the upper portion thereof below said sealing means, said entry means communicating with said compartment and being spaced apart from said vent means.

2. A disposable container as in claim 1 wherein said vent means and entry means are located in the same wall panel below said sealing means.

3. A disposable container as in claim 2 wherein said sealing means comprises aligned interlocking male and female profiles integral with said wall panels, one profile being located on the inner surface of each wall panel near the upper edge thereof and extending across said wall panel from one side edge to the other.

4. A disposable container as in claim 3 wherein said closable vent means comprises an outwardly extending hollow stem secured to said wall panel and plug means fitable into said hollow stem in a fluid tight relationship.

5. A disposable container as in claim 3 wherein said entry means consists of an annular elastomer secured to said wall panel having an inner aperture through which a filling tube may be inserted.

6. A disposable container as in claim 3 wherein said entry means comprises an outwardly extending hollow stem secured to said wall panel.

7. A disposable container as in claim 6 wherein said hollow stem has integral plug means fitable into said hollow stem in a fluid tight relationship.

8. A disposable container as in claim 6 wherein said hollow stem contains a spring loaded valve.

9. A disposable container as in claim 8 wherein said hollow stem has a threaded outer end.

10. A disposable container as in claim 3 additionally containing drain means and extending through a wall panel in the lower portion thereof.

11. A disposable container as in claim 10 wherein said drain means comprises an outwardly extending hollow stem secured to said wall panel and plug means fitable into said hollow stem in a fluid tight relationship.

12. A disposable container as in claim 11 wherein said vent means, entry means and drain means are in the same wall panel.

* * * * *